April 10, 1951 W. A. BROWN 2,547,923
INTERCHANGEABLE TEMPLE FOR EYEGLASS FRAMES
Filed Jan. 18, 1949
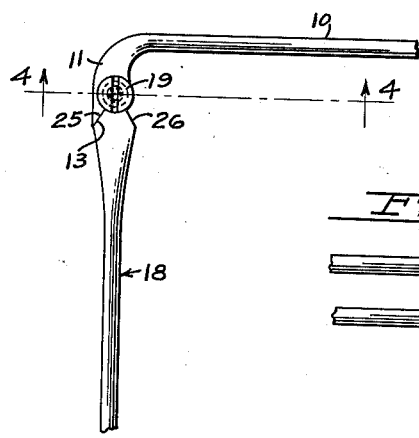
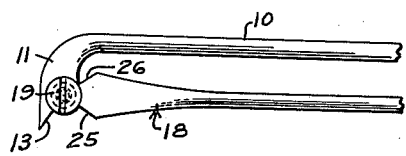
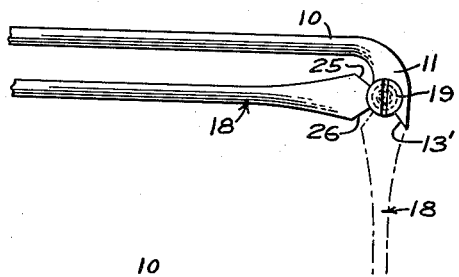
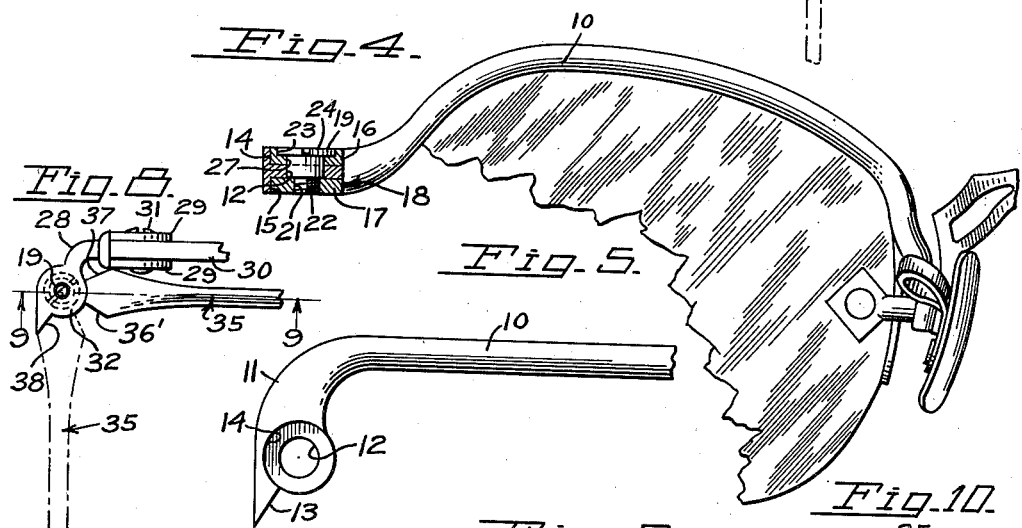
INVENTOR.
William A. Brown
BY Victor J. Evans & Co.
ATTORNEYS Patented Apr. 10, 1951

2,547,923

UNITED STATES PATENT OFFICE 2,547,923

INTERCHANGEABLE TEMPLE FOR EYEGLASS FRAMES

William A. Brown, Lincoln, Maine

Application January 18, 1949, Serial No. 71,509

1 Claim. (Cl. 88—53)

This invention relates to eye glasses.

It is an object of the present invention to provide a temple which is so shaped and shouldered that it can be connected to either the right or left side of the glass frame and serve as either the right or left temple therefor whereby to facilitate the assembly of eye glasses and whereby the temples for both sides of the eye glasses can be made from the same pattern and wherein to provide a connection for the temple wherein the shoulders thereon lie rearwardly of the hinge point.

Other objects of the present invention are to provide eye glasses having interchangeable right and left temples which are of simple construction, easy to assemble, inexpensive to manufacture and efficient in operation.

For other objects and for a better understanding of the invention, reference may be had to the following detailed description taken in connection with the accompanying drawing, in which Figure 1 is a fragmentary top plan view of the glasses with the temple extended at right angle to the frame;

Figure 2 is a fragmentary top plan view of the eye glasses with the temple extended parallel to the frame, the view being shown of metal, the view being shown of a left temple;

Figure 3 is a top plan view of a right temple folded into a position parallel to the frame;

Figure 4 is a transverse sectional view taken on line 4—4 of Figure 1;

Figure 5 is an enlarged fragmentary and top plan view of the frame;

Figure 6 is an enlarged top plan view of a temple;

Figure 7 is a fragmentary side elevational view of a temple;

Figure 8 is a fragmentary top plan view of a modified type of eye glass;

Figure 9 is an enlarged sectional view taken on the line 9—9 of Figure 8;

Figure 10 is a fragmentary side elevational view of the temple for use in the eye glass of Figure 8; and Figure 11 is an enlarged top plan view of the temple of Figure 10.

Referring now to the figures, 10 represents a frame which has at each side a bent portion 11 with a pivot pin opening 12 and an inclined shoulder 13 disposed forwardly of the pivot pin opening. About the pivot pin opening and on the top and bottom sides thereof are respectively recesses 14 and 15 to receive circular attaching and bifurcated portions 16 and 17 respectively of a temple piece 18. With the portions of the temple piece in place, a pivot pin or screw 19 is extended through the pieces to retain the same. The bottom plate attaching portion 17 may be internally threaded as indicated at 21 to receive and retain a threaded portion 22 of the pivot pin 19. The top attaching portion 16 of the temple piece 18 is recessed or cutout at 23 to receive a flat grooved head 24 of the pin 19.

The temple piece 18 is also provided with inclined shoulders 25 and 26 disposed rearwardly of the pivot pin openings of the attaching portions and adapted to respectively abut shoulder 13 of the frame piece 10 depending upon which side of the frame piece it is connected to. The temple pieces are accordingly interchangeable and no matter which one is picked up it can be fitted to either side of the frame. If it is disposed on the left side frame as viewed in Fig. 1, the shoulder 25 thereof will abut the shoulder 13 of the frame piece. If the temple piece is connected to the right side of the frame as viewed in Fig. 3, the shoulder 26 will engage shoulder 13' at the right side of the frame piece. These shoulders are located rearwardly of the pivot pin opening whereby the attaching portions of the temple piece may lie forwardly thereof. The attaching portion 16 has opening 27 for receiving the pin 19 and this opening is of the same size as the opening 12 of the frame piece 10.

The attaching portions being of circular formation fit snugly the circular recesses of the frame piece and provide for a means whereby the temple piece attaching portions will lie within the frame piece and flush with the top and bottom face thereof and serve to support the temple plate while being pivoted to remove certain of the strain from the pivot pin and at the same time provide an arrangement wherein the shoulders may be had on the temple piece.

Referring to Figures 8 to 11 inclusive, there is shown a modified type of eye glass which comprises a short frame 28 having a pair of spaced parallel apertured ears 29 projecting from one end thereof. A portion of a lens 30 is snugly positioned between the projecting ears 29 and a suitable screw or rivet 31 maintains the lens 30 in position between the ears. The other end of the frame is bifurcated to define a pair of spaced apertured circular sections 32 and 33. Positioned between the sections 32 and 33 is a flat end portion 34 of a temple 35, the portion 34 being provided with an opening 36. A pivot pin 19 projects through the apertured circular sections 32 and 33 and through the opening 36 to thereby provide a pivotal connection between the temple 35 and the frame 28. In this embodiment, the temple 35 is provided with shoulders 36' and 37 for selectively abutting the inclined shoulder 38 of the frame 28, to limit pivotal movement of the temple.

While various changes may be made in the detail construction, it shall be understood that such changes shall be within the spirit and scope of the present invention as defined by the appended claim.

I claim:

In eyeglasses, a frame piece having bent end portions, each bent end portion having an opening therein and a shoulder disposed forwardly of said opening, each of said bent end portions having recesses about the opening and on the opposite sides thereof, a pair of temple pieces having bifurcated circular attaching portions snugly seated in the recesses on the opposite sides of the opening and having shoulders disposed rearwardly of the circular portions, one of the shoulders on said temple piece adapted to abut an associated shoulder on the bent portions of the frame piece, the shoulders being disposed symmetrically on said temple pieces so that the pair of temple pieces are interchangeable, one of said attaching portions being threaded internally, there being a cutout in the other of said attaching portions, a pivot pin extending through the attaching portions of the temple piece and the opening in the bent end of the frame piece to secure the pieces together, said pivot pin having an enlarged head on one end thereof seated in said cutout, and its other end arranged in threaded engagement with the internally threaded attaching portion.

WILLIAM A. BROWN.

REFERENCES CITED

The following references are of record in the file of this patent:

UNITED STATES PATENTS

| Number | Name | Date |
|---|---|---|
| 1,394,863 | Reynolds | Oct. 25, 1921 |
| 1,747,843 | Ritholz | Feb. 18, 1930 |
| 2,053,907 | Helman | Sept. 8, 1936 |
| 2,210,507 | Spill | Aug. 6, 1940 |
| 2,300,318 | Schumacher | Oct. 27, 1942 |
| 2,435,918 | Applebaum | Feb. 10, 1948 |

FOREIGN PATENTS

| Number | Country | Date |
|---|---|---|
| 540,883 | Great Britain | Nov. 4, 1941 |